United States Patent [19]

Rodriguez

[11] Patent Number: 4,955,322
[45] Date of Patent: Sep. 11, 1990

[54] FLOAT GUARD FOR A LIVESTOCK WATERING TROUGH

[76] Inventor: Frank N. Rodriguez, 801 N. 9th St., Alpine, Tex. 79830

[21] Appl. No.: 330,064

[22] Filed: Mar. 29, 1989

[51] Int. Cl.$^5$ .............................................. A01K 7/00
[52] U.S. Cl. ...................................... 119/78; 47/28.1; 119/61
[58] Field of Search ............... 119/72, 78, 63, 121, 119/61; 47/28.1, 31

[56] References Cited

U.S. PATENT DOCUMENTS

| | | | |
|---|---|---|---|
| 1,018,522 | 2/1912 | Savage | 47/28.1 |
| 1,158,831 | 11/1915 | Olson | 119/18 |
| 1,274,894 | 8/1918 | Kirby | 119/18 |
| 1,553,746 | 9/1925 | Bulla | 119/63 |
| 1,567,740 | 12/1925 | Lavagetto | 47/28.1 |
| 1,874,141 | 8/1932 | Sueper | 119/72 |
| 2,122,591 | 7/1938 | Smreher, Sr. | 119/61 |
| 2,241,636 | 5/1941 | Eliason | 119/78 |
| 2,658,709 | 11/1953 | Kendall | 119/61 |
| 2,771,058 | 11/1956 | Howard | 119/78 |
| 2,777,454 | 1/1957 | Kramer | 47/28.1 |
| 2,860,601 | 11/1958 | Stein | 119/78 |
| 2,943,601 | 7/1960 | Shank | 119/78 |
| 2,956,543 | 10/1960 | Kirk | 119/121 |
| 2,981,290 | 4/1961 | Putnam | 119/121 |
| 3,194,403 | 7/1965 | Van Horn | 47/28.1 |
| 3,368,580 | 2/1968 | Carter | |
| 3,477,408 | 11/1969 | Mull | 119/78 |
| 3,759,228 | 9/1973 | Keen | 119/78 |
| 4,329,940 | 5/1982 | Humphries | 119/72 |
| 4,744,334 | 5/1988 | McAnally | 119/78 |

*Primary Examiner*—Paul J. Hirsch
*Attorney, Agent, or Firm*—Jerry T. Kearns

[57] ABSTRACT

A float guard for a float controlled watering trough includes a rigid rectangular frame covered by a steel wire mesh to prevent livestock from damaging the float control valve of a watering trough and wasting precious water. In a first embodiment, the guard is perpendicularly secured to a pair of spaced ground insertion spikes adapted to be driven into the ground adjacent a side wall portion of a watering trough. A pair of clamps are vertically adjustable along the spikes and each include a threaded jaw for frictionally engaging a side wall portion of a watering trough. In a second embodiment of the invention, the guard is pivotally secured by a hinge on a mounting bar which is vertically adjustable along the ground insertion spikes to enable usage with a variety of different sizes of watering troughs.

1 Claim, 4 Drawing Sheets

FLOAT GUARD FOR A LIVESTOCK WATERING TROUGH

BACKGROUND OF THE INVENTION

1. Field of the Invention

The present invention relates to float controlled watering troughs, and more particularly pertains to a float guard for preventing livestock damage to the control float valves of such watering troughs. Many farms and ranches utilize float controlled watering troughs for providing a constant level water supply for livestock. In many arid regions of the world, water is an extremely precious commodity which must be utilized at a maximum efficiency for successful farming and ranching operations. While the conventional float controlled watering troughs provide a convenient water supply to livestock without necessitating human intervention, the livestock and wild animals such as deer and elk frequently bend, break and otherwise damage the exposed float valves within the watering troughs. When this occurs, the water supply is not shut off when it reaches the proper level, but continues to run and spills over the sides of the trough resulting in wastage of precious water. Frequently, such watering troughs are located in very remote regions and are only infrequently inspected for damage. During these intervals, a damaged float valve can result in the wastage of literally thousands and thousands of gallons of precious water. In order to overcome this problem, the present invention provides a guard for such float controlled watering troughs which includes a variety of adjustments allowing adaptation for use with a wide variety of different troughs.

2. Description of the Prior Art

Various types of float controlled watering troughs are known in the prior art. A typical example of such a trough is to be found in U.S. Pat. No. 3,368,580, which issued to M. Carter on Feb. 13, 1968. This patent discloses a float control valve for supplying treated water to a livestock tank. U.S. Pat. No. 3,477,408, which issued to L. Mull on Nov. 11, 1969, discloses a float controlled livestock watering trough having a flap type shield for the float mechanism. U.S. Pat. No. 3,759,228, which issued to R. Keen on Sept. 18, 1973, discloses a pet watering dish having a float control valve. U.S. Pat. No. 4,329,940, which issued to W. Humphries on May 18, 1982, discloses a livestock watering trough utilizing a float control valve for adding a liquid additive to a drinking water supply. U.S. Pat. No. 4,744,334, which issued to C. McAnally on May 17, 1988, discloses a self contained solar powered unit for watering livestock. A solar collecting panel generates electricity for powering a fluid pump that pumps fluid into a reservoir tank. A float control valve is utilized to supply water from the reservoir into a drinking trough.

While the above mentioned devices are directed to float controlled watering troughs, none of these devices disclose a float guard adapted for retro-fitting to a conventional watering trough for protecting an exposed float control valve from livestock damage. Additional features of the present invention, not contemplated by the aforesaid prior art devices, include the provision of a pivotal vertically adjustable guard having ground insertion supporting spikes provided with frictional vertically adjustable clamping members for securement to side wall portions of a wide variety of different sized watering troughs. Inasmuch as the art is relatively crowded with respect to these various types of float controlled watering troughs, it can be appreciated that there is a continuing need for and interest in improvements to such float controlled watering troughs, and in this respect, the present invention addresses this need and interest.

SUMMARY OF THE INVENTION

In view of the foregoing disadvantages inherent in the known types of float controlled watering troughs now present in the prior art, the present invention provides an improved float guard for a livestock watering trough. As such, the general purpose of the present invention, which will be described subsequently in greater detail, is to provide a new and improved float guard for a livestock watering trough which has all the advantages of the prior art float controlled watering troughs and none of the disadvantages.

To attain this, representative embodiments of the concepts of the present invention are illustrated in the drawings and make use of a float guard for a float controlled watering trough including a rigid rectangular frame covered by a steel wire mesh to prevent livestock from damaging the float control valve of a watering trough and wasting precious water. In a first embodiment, the guard is perpendicularly secured to a pair of spaced ground insertion spikes adapted to be driven into the ground adjacent a side wall portion of a watering trough. A pair of clamps are vertically adjustable along the spikes and each include a threaded jaw for frictionally engaging a side wall portion of a watering trough. In a second embodiment of the invention, the guard is pivotally secured by a hinge on a mounting bar which is vertically adjustable along the ground insertion spikes to enable usage with a variety of different sizes of watering troughs.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved float guard for a livestock watering trough which has all the advantages of the prior art float controlled watering troughs and none of the disadvantages.

It is another object of the present invention to provide a new and improved float guard for a livestock watering trough which may be easily and efficiently manufactured and marketed.

It is a further object of the present invention to provide a new and improved float guard for a livestock watering trough which is of a durable and reliable construction.

An even further object of the present invention is to provide a new and improved float guard for a livestock watering trough which is susceptible of a low cost of manufacture with regard to both materials and labor, and which accordingly is then susceptible of low prices of sale to the consuming public, thereby making such float guards economically available to the buying public.

Still yet another object of the present invention is to provide a new and improved float guard for a livestock watering trough which provides in the apparatuses and methods of the prior art some of the advantages thereof, while simultaneously overcoming some of the disadvantages normally associated therewith.

Still another object of the present invention is to provide a new and improved float guard for a livestock watering trough for preventing livestock damage to float control valves of watering troughs.

Yet another object of the present invention is to provide a new and improved float guard for a livestock watering trough which prevents wastage of precious water supply.

Even still another object of the present invention is to provide a new and improved float guard for a livestock watering trough which includes a variety of adjustable features allowing adaptation for usage with a variety of different sizes of conventional watering troughs.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
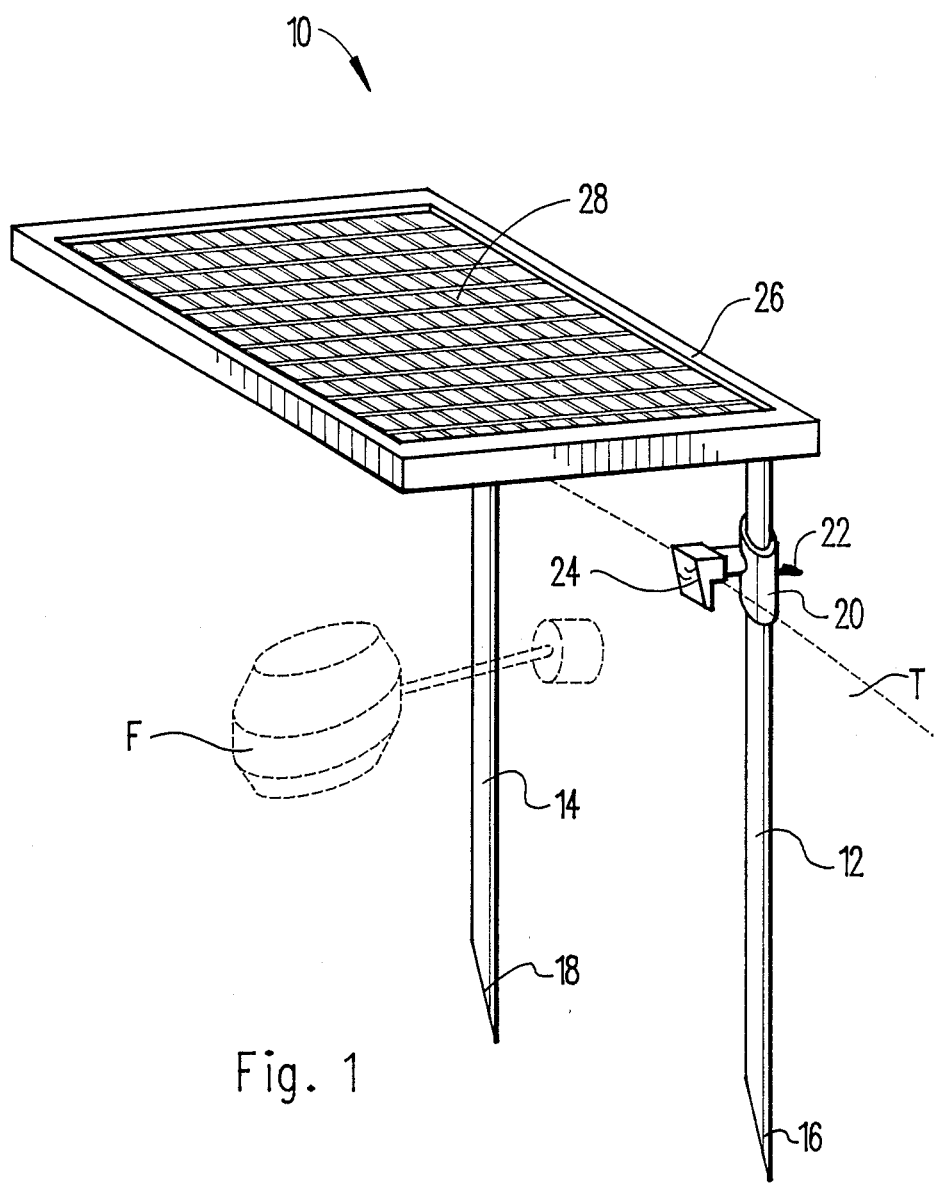
FIG. 1 is a perspective view illustrating a float guard according to a first embodiment of the present invention.

With reference now to the drawings, and in particular to FIG. 1 thereof, a new and improved float guard for a livestock watering trough embodying the principles and concepts of the present invention and generally designated by the reference numeral 10 will be described.

More specifically, it will be noted that the first embodiment 10 of the invention includes a rigid rectangular frame 26 covered by a heavy gage wire mesh 28. A pair of ground insertion spikes 12 and 14 having respective pointed tip portions 16 and 18 are perpendicularly secured along one longitudinal edge of the frame 26. In use, the spikes 12 and 14 are inserted into the ground adjacent an exterior side wall portion of a float controlled watering trough T. A conventional float control valve F maintains the water at a constant level within the trough T. One or a pair of clamping members are provided on the ground inserted spikes 12 and 14. The clamp is in the form of a hollow cylindrical sleeve 20 secured in an adjusted position along the length of the spike 12 by a set screw 22. A frictional clamping jaw 24 engages the top side edge portion of the trough T to secure the guard 28 in position over the float F. The guard prevents livestock from damaging the valve and because of the open mesh construction 28 allows visual inspection of the valve F.

Figure 2:
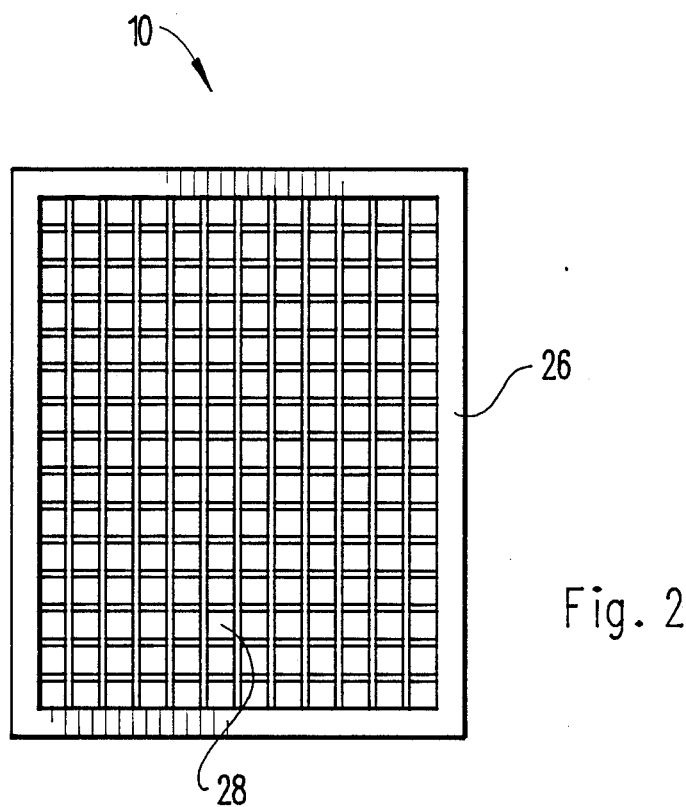
FIG. 2 is a top plan view of the float guard of FIG. 1.

FIG. 2 is a top plan view of the guard 10, further illustrating the rectangular frame 26 and the mesh covering 28. The frame 26 and mesh 28 are preferably formed from a heavy gage steel material which may be plaited or painted to prevent corrosion and to provide a long service life.

Figure 3:
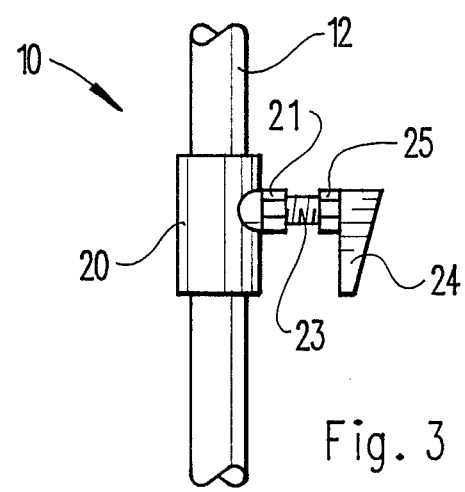
FIG. 3 is an enlarged detail view illustrating the trough side wall engaging clamp of the float guard of FIG. 1.

FIG. 3 illustrates a detail view of the trough side wall clamp which includes the sleeve 20 having a laterally extending threaded stud 23 projecting therefrom. A first lock nut 21 secures the stud 23 to a threaded boss on the sleeve 20 and a second lock nut 25 secures the clamping member 24 in an adjusted position. The clamp thus forms a frictional jaw-type clamp for secure engagement with the top edge of a water trough side wall to prevent dislocation of the guard by livestock.

Figure 4:
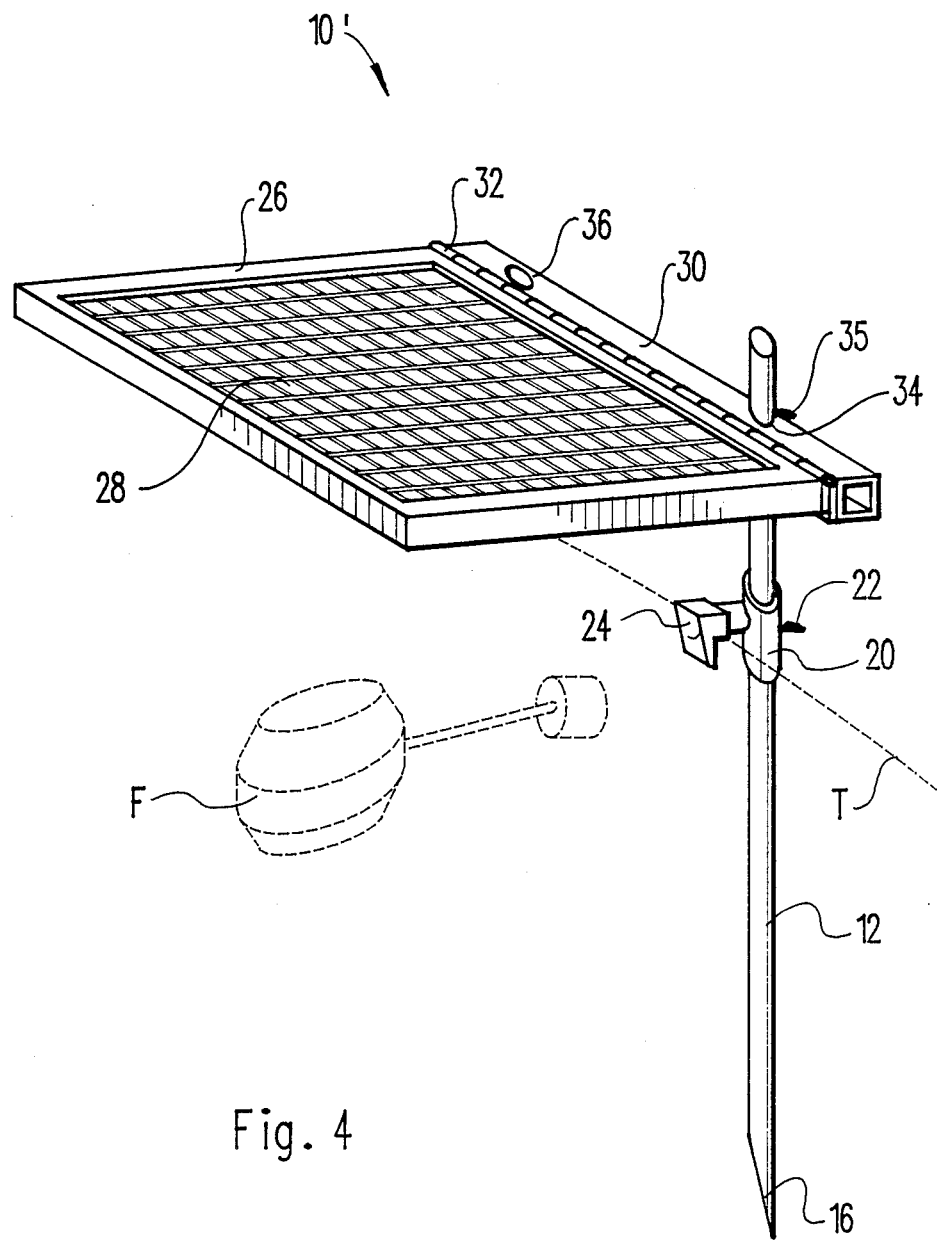
FIG. 4 is a perspective view illustrating a float guard according to a slightly modified second embodiment of the present invention.

FIG. 4 is a perspective view illustrating a modified float guard 10' according to a second embodiment of the invention. The second embodiment 10' is generally similarly constructed as previously described, with the exception that a mounting bar 30 is secured by a hinge 32 extending along a longitudinal edge of the frame 26. Additionally, the upper portion of the ground insertion spike 12 extends through an aperture 34 in the mounting bar 30 and is secured by a set screw 35. An additional aperture 36 is provided for a similar ground insertion spike. This construction allows the frame 26 and mounting bar 30 to be vertically adjusted along the spike 12 to position the guard 28 for use with a variety of differently sized watering troughs. Additionally, the trough side wall clamp 20 may be vertically adjusted along the spike 12 and secured in the desired position by the set screw 22.

Figure 5:
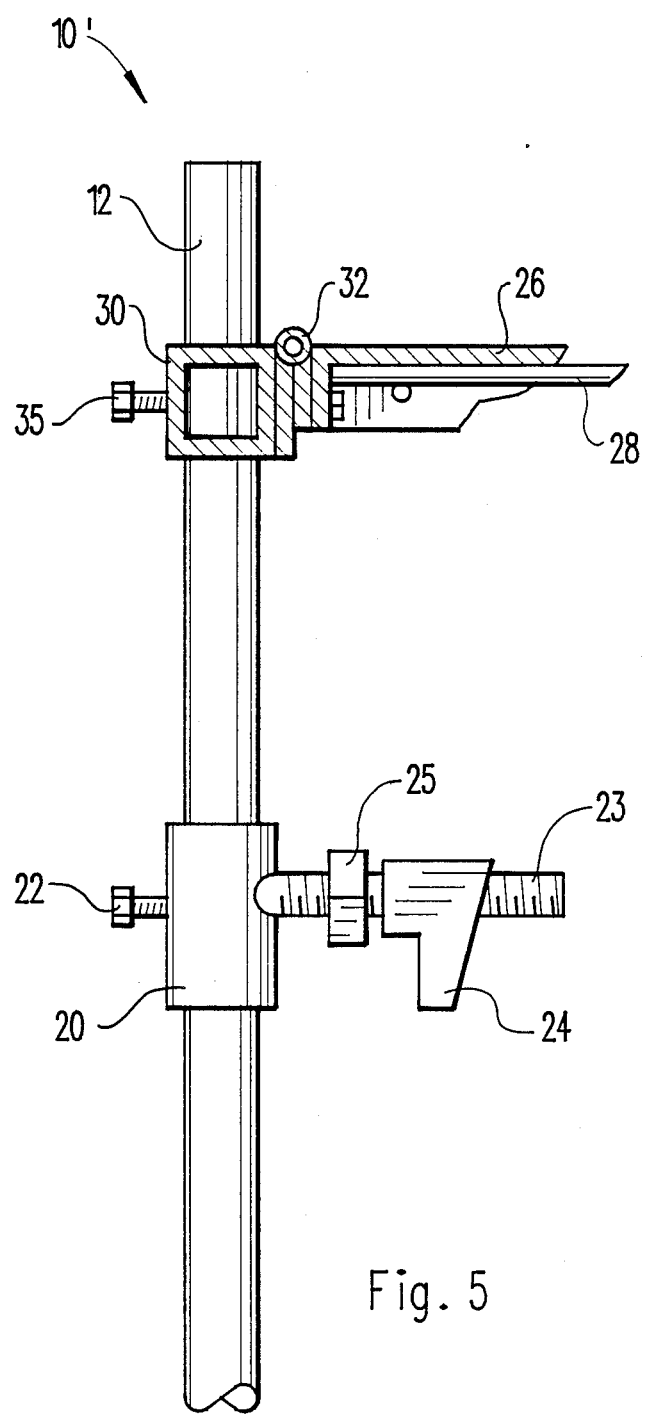
FIG. 5 is a detail view, partially in cross section, illustrating the adjustable features of the float guard of FIG. 4.

FIG. 5 is a detail view illustrating the construction of the clamp 20 and adjustable securement of the mounting bar 30 on the spike 12. The clamp 20 includes a laterally extending threaded stud 23 which is received through a threaded aperture in the clamp jaw 24. A lock nut 25 secures the jaw 24 in an adjusted position. By virtue of the pivotal securement of the frame 26 by the hinge 32 to the mounting bar 30, the frame 26 and wire mesh guard 28 may be pivoted to an open position to allow access for adjustment of the float control valve when required.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A float guard for a livestock watering trough, comprising:
   a rigid frame;
   a wire mesh covering said frame;
   a mounting bar pivotally secured to said frame;
   at least one ground insertion spike perpendicularly received through an aperture in said mounting bar;
   said frame mounted for pivotal movement on said mounting bar for movement about an axis perpendicular to said ground insertion spike;
   a set screw in threaded engagement with said mounting bar and moveable into clamping engagement with said ground insertion spike for securing said mounting bar at a selected position along said ground insertion spike;
   at least one vertically adjustable trough clamp, said trough clamp having a threaded clamping jaw for frictionally engaging a side wall of a watering trough; and
   clamping means adjustably securing said trough clamp at a selected adjusted position on said ground insertion spike.

* * * * *